US012583634B2

(12) United States Patent
Gokhale et al.

(10) Patent No.: US 12,583,634 B2
(45) Date of Patent: Mar. 24, 2026

(54) AGGREGATE TOGGLING BETWEEN DEPLOYED AND FOLDED POSITION BY DEFLECTION OF A PLATE SPRING

(71) Applicant: ideaForge Technology Limited, Navi Mumbai (IN)

(72) Inventors: Shubhankar Gokhale, Navi Mumbai (IN); Piyush Divyajit, Navi Mumbai (IN); Utsav Golchha, Navi Mumbai (IN)

(73) Assignee: ideaForge Technology Limited, Navi Mumbai (IN)

( * ) Notice: Subject to any disclaimer, the term of this patent is extended or adjusted under 35 U.S.C. 154(b) by 0 days.

(21) Appl. No.: 19/080,958

(22) Filed: Mar. 17, 2025

(65) Prior Publication Data

US 2025/0289596 A1 Sep. 18, 2025

(30) Foreign Application Priority Data

Mar. 15, 2024 (IN) .............................. 202421019307

(51) Int. Cl.
B64U 40/10 (2023.01)
B64U 10/10 (2023.01)
B64U 60/50 (2023.01)

(52) U.S. Cl.
CPC ............. B64U 40/10 (2023.01); B64U 10/10 (2023.01); B64U 60/50 (2023.01)

(58) Field of Classification Search
CPC .... B64U 30/20; B64U 30/293; B64U 30/296; B64U 20/50; B64U 60/50; B64C 3/56; B64C 1/063; B64C 2211/00; B64C 25/10; B64C 25/12; B64C 25/14; B64C 2025/125
See application file for complete search history.

(56) References Cited

U.S. PATENT DOCUMENTS

| | | | | |
|---|---|---|---|---|
| 8,640,988 | B2 * | 2/2014 | Thompson | .............. B64C 25/18 |
| | | | | 244/102 R |
| 9,592,908 | B2 * | 3/2017 | Gentry | ................... B64U 50/14 |
| 11,787,574 | B2 * | 10/2023 | Zhang | ................... B64D 31/06 |
| | | | | 244/17.23 |
| 2011/0031348 | A1 * | 2/2011 | Thompson | .............. B64C 25/12 |
| | | | | 244/102 R |
| 2022/0227485 | A1 * | 7/2022 | Harris | .................... B64C 25/32 |

FOREIGN PATENT DOCUMENTS

| | | | | | |
|---|---|---|---|---|---|
| CN | 107380441 | A | * 11/2017 | .............. | B64C 1/30 |
| CN | 111924088 | A | * 11/2020 | ............. | B64U 10/10 |

\* cited by examiner

*Primary Examiner* — Arfan Y. Sinaki

(74) *Attorney, Agent, or Firm* — JMB Davis Ben-David

(57) ABSTRACT

A device 100 for pivotally holding and locking an aggregate of an aerial vehicle (AV) includes a housing 102 fixed to the body of the AV; a cam structure 104 pivotally coupled to the housing 102 for pivotal movement about a pivot axis between a deployed position, in which the aggregate fixed to the cam structure 104 is operational, and a folded position, in which the aggregate is not operational; and a plate spring 106 configured in the housing 102. Cam structure 104 is configured relative to the plate spring 106 such that, when the cam structure 104 is moved between the deployed position and the folded position, the cam structure 104 deflects the plate spring 106 to cause toggling of the aggregate between the deployed position and the folded position. The aggregate is any of a rotor arm assembly and a landing gear 108.

12 Claims, 5 Drawing Sheets

400

102

108

104

102

108

104

AGGREGATE TOGGLING BETWEEN DEPLOYED AND FOLDED POSITION BY DEFLECTION OF A PLATE SPRING

CROSS-REFERENCE TO RELATED APPLICATION

Benefit is claimed to Indian Patent Application number 202421019307, filed Mar. 15, 2024, the contents of which are incorporated by reference herein in their entirety.

TECHNICAL FIELD

The present disclosure relates generally to the field of unmanned aerial vehicles. In particular, the present disclosure relates to a device for pivotally holding an aggregate of an aerial vehicle, such as a rotor arm and a landing gear.

BACKGROUND

Background description includes information that may be useful in understanding the present invention. It is not an admission that any of the information provided herein is prior art or relevant to the presently claimed invention, or that any publication specifically or implicitly referenced is prior art.

Unmanned vehicles have become indispensable in various fields such as surveillance, search and rescue operations, exploration, and more. These vehicles, including drones, unmanned ground vehicles, aerial vehicles, surface vehicles, and spacecrafts; have undergone continuous development to meet the diverse demands of their applications. One common feature among many drones is the use of rotors to provide vertical lift, allowing them to hover and manoeuvre effectively. Typically, these drones consist of a drone body and several articulated arms, each carrying a rotor. However, the arms of drones are generally non-foldable making them bulky and difficult to transport and package.

In order to facilitate the transport and packaging of drones, a foldable drone structure may be employed, which can transition from an unfolded configuration to a folded configuration intended for transport and in which the drone structure is more compact. However, one issue with foldable drone structures is that they tend to be heavier than their non-folding counterparts due to the additional components required for folding, such as hinges, locks, and latches. This added weight can have adverse effects on the drone's flight dynamics and flight range. Moreover, the repeated folding and unfolding of these mechanisms can lead to wear and tear, potentially compromising the drone's stability and safety during flight.

Efforts have been made to meet the problem and provide a device for pivotally holding an aggregate in a housing of the aerial vehicle. For instant Patent Document U.S. Pat. No. 9,592,908B2 discloses a configuration of an ariel vehicle (AV) landing gear assembly extension that may be extended or contracted so that the body of the AV is contained in a horizontal plane when the AV is landed, even on sloping surfaces supported by the landing gear extensions.

While the cited reference discloses extension and contraction of the landing gears, there is a possibility to have better solution to have extension and contraction facility for the landing gears and even other movable aggregates.

Thus, a challenge in the drone industry is the need for efficient transportation and packaging of these ariel vehicles. There is, therefore, a need for a mechanism that can allow the aggregate to easily and efficiently transition between folded and unfolded positions, and also lock the aggregate in the two positions, when moved thereto, thereby keeping the drone structure compact, lightweight, and convenient for transportation and packaging.

Some of the objects of the present disclosure, which at least one embodiment herein satisfy are as listed herein below.

It is an object of the present disclosure to overcome the above drawbacks, shortcomings, and limitations associated with existing aerial vehicles (AVs).

It is an object of the present disclosure to provide a simple, improved, and efficient mechanism for moving an aggregate of the AV between folded position and unfolded position.

It is an object of the present disclosure to minimize wear and tear in the foldable aggregates associated with AVs, reducing maintenance and replacement costs.

It is an object of the present disclosure to reduce friction and stress during the folding and unfolding of the aggregates associated with AVs.

It is the object of the present disclosure to provide a device for AVs, which can enable easy and efficient transition of the corresponding aggregate between an unfolded configuration and a folded configuration while keeping the AV structure compact, lightweight, and convenient for transportation and packaging.

SUMMARY

The present disclosure relates to the field of unmanned aerial vehicles. In particular, the present disclosure relates to a device for moving and locking a movable aggregate of an Aerial Vehicle, such as a rotor arm and a landing gear, in different positions, such as a folded position and an unfolded position.

In an aspect of the disclosure, the disclosed device for pivotally holding an aggregate of an aerial vehicle includes a housing fixed to body of the aerial vehicle; a cam structure pivotally coupled to the housing for pivotal movement about a pivot axis between a deployed position, in which the aggregate fixed to the cam structure is functional, and a folded position, in which the aggregate is not functional; and a plate spring configured in the housing such that the cam structure is in contact with the plate spring, and the cam structure is configured relative to the plate spring such that, when the cam structure is moved between the deployed position and the folded position, the cam structure deflects the plate spring to cause toggling of the aggregate between the deployed position and the folded position.

In one or more embodiments, the aggregate may be any of a rotor, a landing gear and a sensor.

In one or more embodiments, when the aggregate is moved about the pivot axis between the deployed position and the folded position, the cam structure moves over the plate spring between a first contact point located towards a first end of the plate spring and second contact point located towards a second end of the plate spring, the first end and the second end of the plate spring being two ends of the plate spring along a length of the plate spring.

In one or more embodiments, when the cam structure moves over the plate spring during the movement of the aggregate from any of the deployed position and the folded position towards other of the deployed position and the folded position, the cam structure deflects the plate spring, which deflection includes a hump at a predefined point during the movement, the hump resulting in toggling of the aggregate between the deployed position and the folded position.

In one or more embodiments, the cam structure may include one or more bearings fixed for free rotation at a predefined distance from the pivot axis, such that when the aggregate undergoes pivotal movement about the pivot axis between the deployed position and the folded position, an outer surface of the one or more bearings moves over the plate spring between the first contact point located towards the first end of the plate spring and the second contact point located towards the second end of the plate spring.

In one or more embodiments, the cam structure may include a shaft and the one or more bearings may be fixed for free rotation on the shaft.

In one or more embodiments, the bearings may be configured over the shaft such that respective outer surfaces of the bearings are in contact with the plate spring at different points along a width of the plate spring.

In one or more embodiments, when the aggregate is at the deployed position and the folded position, there may not be any deflection of the plate spring.

In one or more embodiments, the housing may include an inner hollow region there within, and the plate spring may be fixed within the inner hollow region.

In one or more embodiments, the housing may include at least one stop to retain the aggregate in at least one of the deployed position and the folded position.

In one or more embodiments, when the aggregate is at the deployed position and the folded position, the plate spring may be in a deflected position to provide a biasing force to force the rotor arm against the respective stop.

In one or more embodiments, the plate spring may be chosen from a group of materials that includes a carbon fibre material.

Another aspect of the disclosure pertains to a foldable rotor arm assembly, which can include an arm assembly including an outer end holding at least one rotor, and an inner end pivotally coupled to a housing of the aerial vehicle for pivotal movement about a pivot axis between a deployed position, in which the at least one rotor fixed to the outer end is functional, and a folded position, in which the at least one rotor is not functional. The rotor arm assembly is configured to pivotally move in a horizontal plane, and the direction of movement of the rotor arm from the folded position to the deployed position is such that a reaction torque of the at least one rotor tends to move the rotor arm towards the deployed position.

In one or more embodiments, the inner end of the arm assembly may include a cam structure, such that when the arm assembly undergoes pivotal movement about the pivot axis between the deployed position and the folded position, the cam structure moves over a plate spring configured within the housing to toggle the rotor arm assembly between the deployed position and the folded position.

Yet another aspect of the disclosure pertains to a device for pivotally holding an aggregate. The device includes a housing; a cam structure pivotally coupled to the housing for pivotal movement about a pivot axis between a deployed position, in which the aggregate fixed to the cam structure is functional, and a folded position, in which the aggregate is not functional; and a plate spring configured in the housing such that the cam structure is in contact with the plate spring. The cam structure is configured relative to the plate spring such that, when the cam structure is moved between the deployed position and the folded position, the cam structure deflects the plate spring to cause toggling of the aggregate between the deployed position and the folded position.

Various objects, features, aspects and advantages of the present disclosure will become more apparent from the following detailed description of preferred embodiments, along with the accompanying drawing figures in which like numerals represent like features.

Within the scope of this application, it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

5 end of the plate spring when the rotor arm is in deployed position, in accordance with embodiments of the present disclosure.

Figure 4A:
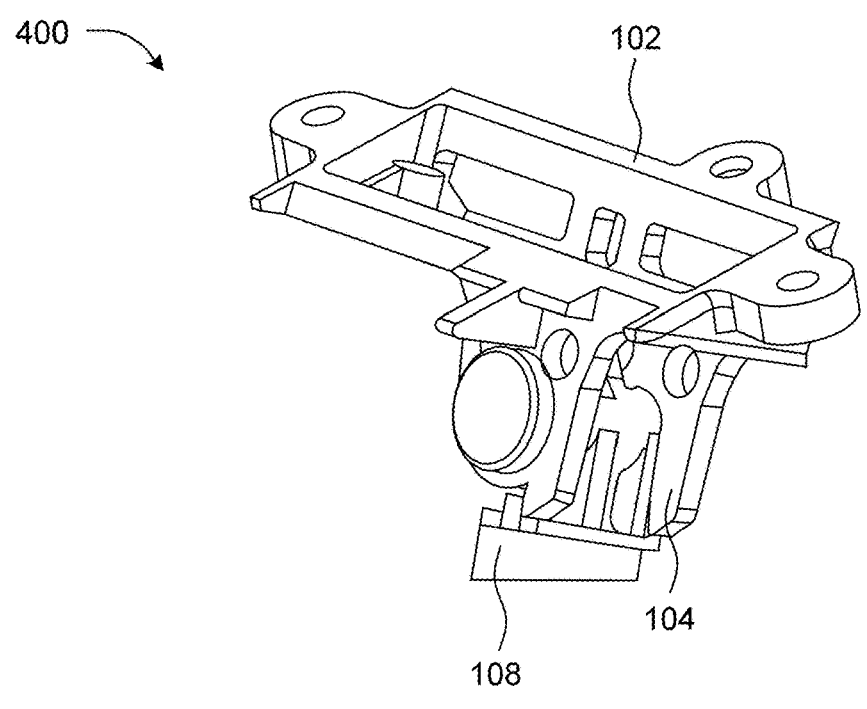
Figure 4B:
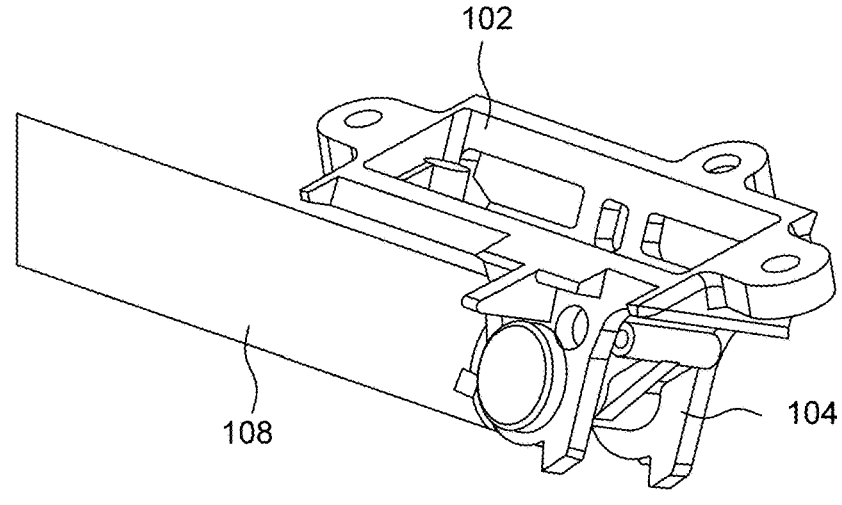

FIGS. 4A and 4B illustrate exemplary perspective views a foldable landing gear pivotally coupled to a housing of the proposed device, respectively showing unfolded and folded position of the landing gear, in accordance with embodiments of the present disclosure.

Figure 5:
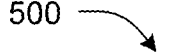
Figure 5:
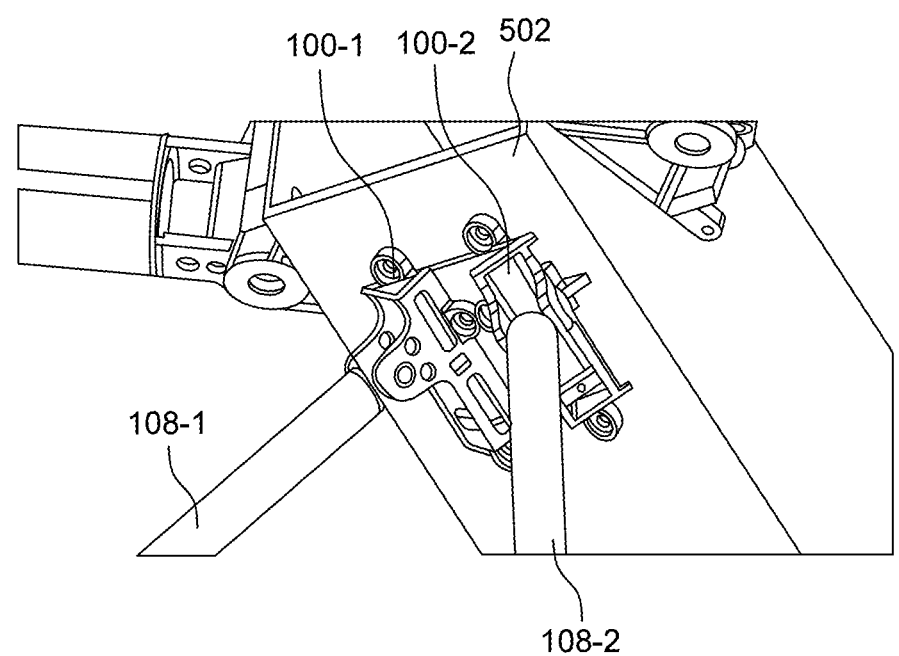

FIG. 5 illustrates an exemplary perspective view showing a pair of landing gear coupled to an AV through the proposed devices, in accordance with embodiments of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The use of "including", "comprising" or "having" and variations thereof herein is meant to encompass the items listed thereafter and equivalents thereof as well as additional items. The terms "a" and "a" herein do not denote a limitation of quantity, but rather denote the presence of at least one of the referenced items. Further, the use of terms "first", "second", and "third", and the like, herein do not denote any order, quantity, or importance, but rather are used to distinguish one element from another.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The present disclosure relates generally to the field of unmanned aerial vehicles. In particular, the present disclosure relates to a device for pivotally holding an aggregate of an aerial vehicle, such as a rotor arm and a landing gear.

In an embodiment, the present disclosure is about a device for pivotally holding an aggregate having a housing; a cam structure pivotally coupled to the housing for pivotal movement about a pivot axis between a deployed position, in which the aggregate fixed to the cam structure is functional, and a folded position, in which the aggregate is not functional; and a plate spring configured in the housing such that the cam structure is configured relative to the plate spring and, when the cam structure is moved between the deployed position and the folded position, the cam structure deflects the plate spring to cause toggling of the aggregate between the deployed position and the folded position. The aggregate is any of a rotor, a landing gear, and a sensor.

In an aspect, the cam structure and the plate spring may be configured with the housing such that, in the folded and/or the deployed position of the aggregate, the plate spring is in a deflected position, causing a force on the cam structure that biases the cam structure towards the respective of the folded and/or deployed positions, thereby locking the aggregate in that position.

In an embodiment, when the aggregate is moved about the pivot axis between the deployed position and the folded position, the cam structure moves over the plate spring between a first contact point located towards a first end of the plate spring and second contact point located towards a second end of the plate spring, the first end and the second end of the plate spring being two ends of the plate spring along a length of the plate spring.

In an embodiment, when the cam structure moves over the plate spring during the movement of the aggregate from any of the deployed position and the folded position towards other of the deployed position and the folded position, the cam structure deflects the plate spring, which deflection includes a hump at a predefined point during the movement, the hump resulting in toggling of the aggregate between the deployed position and the folded position.

In an embodiment, the cam structure includes one or more bearings fixed for free rotation at a predefined distance from the pivot axis, such that when the aggregate undergoes pivotal movement about the pivot axis between the deployed position and the folded position, an outer surface of the one or more bearings moves over the plate spring between the first contact point located towards the first end of the plate spring and the second contact point located towards the second end of the plate spring.

In an embodiment, the cam structure includes a shaft and the one or more bearings are fixed for free rotation on the shaft.

In an embodiment, the bearings are configured over the shaft such that respective outer surfaces of the bearings are in contact with the plate spring, fixed within the inner hollow region of the housing, along a width of the plate spring, and when the aggregate is at the deployed position and the folded position, there is no deflection of the plate spring.

In an embodiment, the housing includes at least one stop to retain the aggregate in the deployed position and the folded position.

In an embodiment, when the aggregate is at the deployed position and the folded position, the plate spring is in a deflected position to provide a biasing force to force the rotor arm against the respective stop.

In another embodiment, a foldable rotor arm assembly, which can include an arm assembly including an outer end holding at least one rotor, and an inner end pivotally coupled to a housing of the aerial vehicle for pivotal movement about a pivot axis between a deployed position, in which the at least one rotor fixed to the outer end is functional, and a folded position, in which the at least one rotor is not functional. The rotor arm assembly is configured to pivotally move in a horizontal plane, and the direction of movement of the rotor arm from the folded position to the deployed position is such that a reaction torque of the at least one rotor tends to move the rotor arm towards the deployed position.

In another embodiment, a device for pivotally holding an aggregate can include a housing; a cam structure pivotally coupled to the housing for pivotal movement about a pivot axis between a deployed position, in which the aggregate fixed to the cam structure is functional, and a folded position, in which the aggregate is not functional; and a plate spring configured in the housing such that the cam structure is in contact with the plate spring; and the cam structure is configured relative to the plate spring such that, when the cam structure is moved between the deployed position and the folded position, the cam structure deflects the plate spring to cause toggling of the aggregate between the deployed position and the folded position.

Figure 1A:
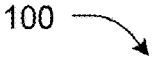
FIG. 1A illustrates an exemplary perspective view of the proposed device implemented with a landing gear as an aggregate, on an aerial vehicle, in accordance with embodiments of the present disclosure.
Figure 1A:
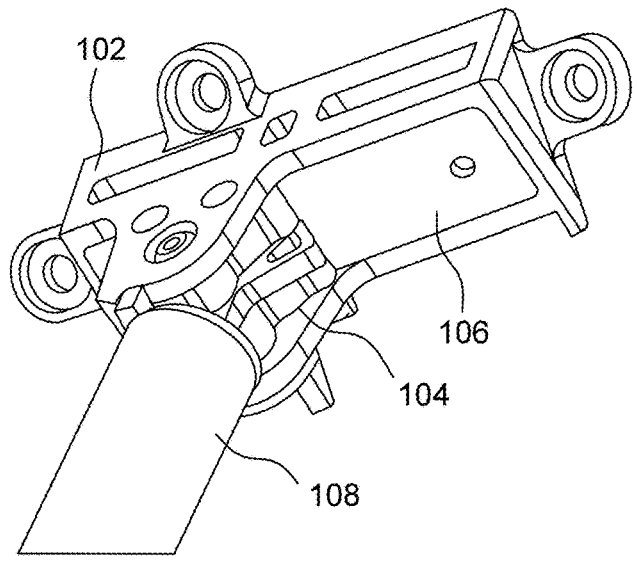
Figure 1B:
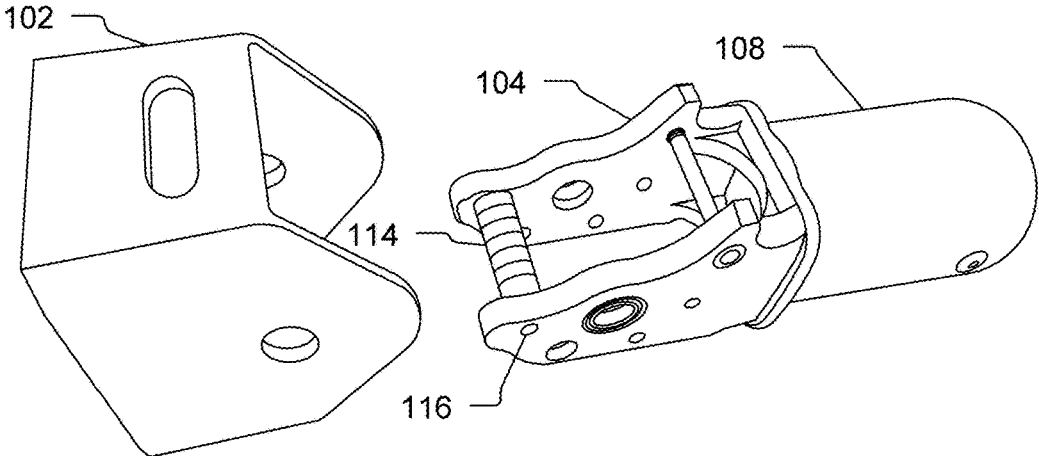
FIG. 1B illustrates an exemplary exploded view of the device of FIG. 1A, showing a housing and a cam structure of the proposed device, in accordance with an embodiment of the present invention.

Referring to FIGS. 1A and 1B where exemplary perspective and exploded views of the proposed device 100 implemented with a landing gear 108 as an aggregate, are shown, the device 100 for the aerial vehicle (refer to as AV, herein) can include a housing 102 fixed to the body of the AV; a cam structure 104 pivotally coupled to the housing 102 for pivotal movement about a pivot axis; and a plate spring 106 configured in the housing 102.

In an embodiment, the housing 102 includes an inner hollow region there within, and the plate spring 106 is fixed within the inner hollow region.

In an embodiment, the cam structure 104 can move over the plate spring 106 during movement between a deployed position, in which the aggregate fixed to the cam structure 104 is functional, and a folded position, in which the aggregate is not functional. The plate spring 106 is configured in the housing 102 such that the cam structure 104 is in contact with the plate spring 106. Further. the cam structure 104 can be configured relative to the plate spring 106 such that, when the cam structure 104 is moved between the deployed position and the folded position, the cam structure 104 deflects the plate spring 106 to cause toggling of the aggregate between the deployed position and the folded position.

In an embodiment, the plate spring 106 can be chosen from a group of materials but not limited to a carbon fibre material and leaf spring.

In an embodiment, the aggregate can be any of a rotor, a landing gear or sensors, or any other device mounted on the AV for movement between folded and deployed positions.

In an embodiment, the cam structure 104 along with the landing gear 108 and the housing 102 as shown in the FIG. 1B, can include a shaft 116 and the one or more bearings 114 rotatably fixed over the shaft 116 such that when the aggregate undergoes pivotal movement about the pivot axis between the deployed position and the folded position, an outer surface of the one or more bearings 114 moves over the plate spring 106.

In an embodiment, the device can be configured for detachable coupling to the AV. Towards that, the housing 102 of the device 100 can include an adaptive gripping system that can use sensors and actuators to adjust its grip to the shape and size of the aggregate. This can ensure a secure connection of the AV to a variety of aggregates without a need for manual adjustments. For example, the housing 102 can be equipped with strong magnets that can be attracted to a magnetic plate or attachment point. The magnetic force can ensure a quick and reliable mounting of the aggregate along with the device 100. Further, in an exemplary embodiment, the housing 102 can include a latch and lock system that can engage with a corresponding latch or receiver. The positioning of the housing 102 can automatically latch the housing 102 and can be further secured with a locking mechanism for added stability.

Figure 2A:
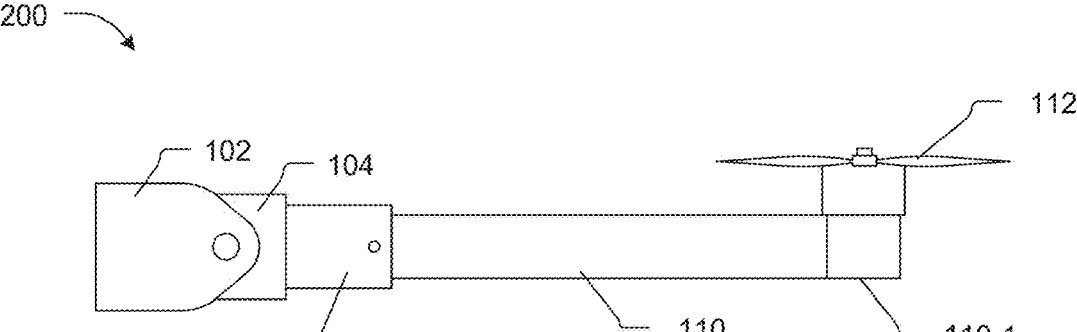
FIG. 2A illustrates an exemplary schematic diagram depicting side view of the proposed device implemented with a foldable rotor arm of an aerial vehicle, in accordance with an embodiment of the present invention.
Figure 2B:
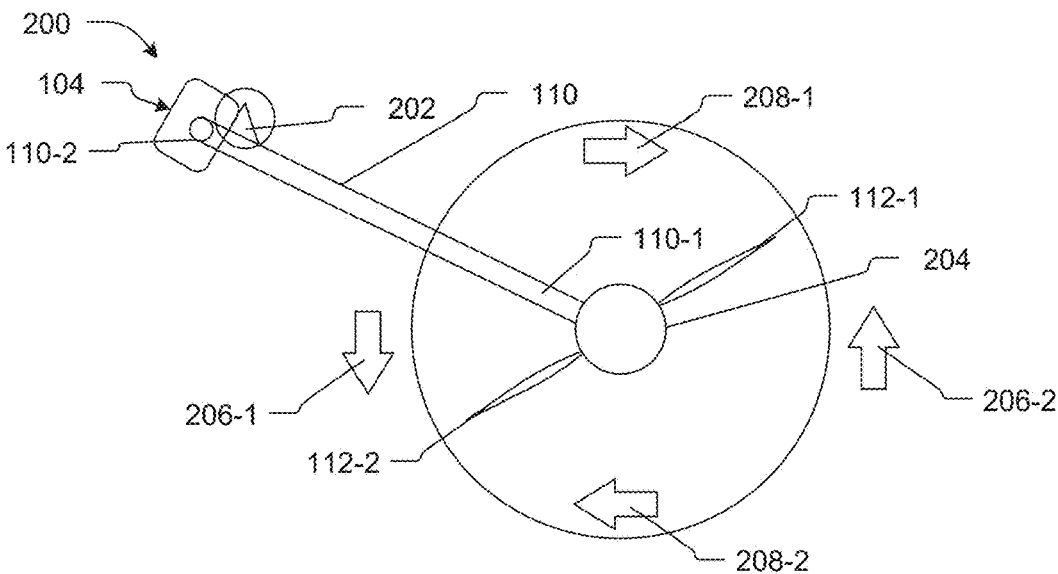
FIG. 2B illustrates an exemplary top view of the proposed foldable rotor arm assembly in the folded position, in accordance with an embodiment of the present invention.
Figure 2C:
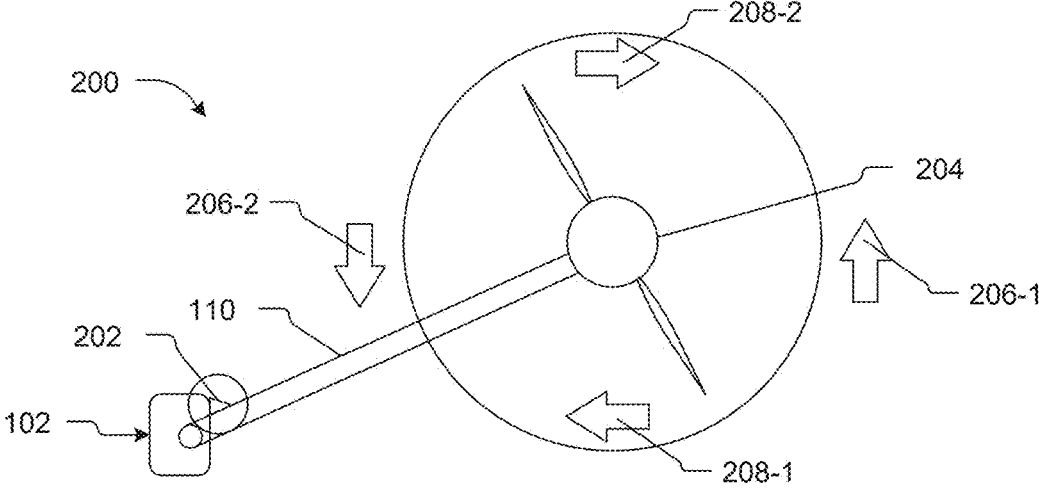
FIG. 2C illustrates an exemplary top view of the proposed foldable rotor arm assembly in the deployed position, in accordance with an embodiment of the present invention.

FIGS. 2A, 2B, and 2C illustrate exemplary side view of the proposed foldable rotor arm assembly 200 in deployed position, a top view of the proposed foldable rotor arm assembly 200 in the folded position, and in the deployed position, respectively.

In an embodiment, the device 100 can be implemented for a foldable rotor arm assembly 200 which includes a rotor arm 110. The rotor arm 110 can have an outer end 110-1 and an inner end 110-2, where the outer end 110-1 can securely hold at least one rotor 204. The inner end 110-2 of the rotor arm 110 can be pivotally coupled to a housing 102 fixed to the aerial vehicle for pivotal movement about a pivot axis between a deployed position, in which the at least one rotor fixed to the outer end 110-1 can be functional.

In an embodiment, the FIG. 2A depicts top view of the foldable rotor arm assembly 200 along with the rotor arm 110 and rotor blades 112 fixed to the rotor 204, in deployed condition.

In an embodiment, the cam structure 104, in deployed condition, has moved over the plate spring 106 from a folded position to the deployed position, in which the rotor arm 110 fixed to the cam structure 104 is functional.

In an embodiment, the inner end 110-2 of the rotor arm 110 is coupled to the cam structure 104 which is pivotally coupled with the housing 102 such that when the foldable arm assembly 200 undergoes pivotal movement about the pivot axis between the deployed position and the folded position, the cam structure 104 moves over the plate spring 106 to toggle and lock the rotor arm assembly between the deployed position and the folded position.

In an embodiment, the foldable rotor arm assembly 200 can be configured to pivotally move in a horizontal plane. The direction of movement of the rotor arm 110 from the folded position as shown in FIG. 2B to the deployed position, as shown in FIG. 2C, can be such that a reaction torque from the functional rotors on the rotor arm 110, as shown by the arrows 206-1 and 206-2, tends to move the foldable rotor arm assembly 200 towards the deployed position. In an implementation, considering that the rotor arm 110 to be on the front right side, and the blades 112-1 and 112-2 (collectively refer to as blades 112, herein) rotating clockwise, as shown by the arrows 208-1 and 208-2, the reaction torque shall be anticlockwise. Accordingly, as the tendency of the reaction torque is to rotate the whole arm anticlockwise as shown by the arrows 206-1 and 206-2, a stopper, such as the stopper 202 can be provided on the cam structure 104 to lock the rotor arm assembly in the position. The stopper 202 can be set at a specific angle such that the rotor arm assembly 200 is stable at that angle. Moreover, as the rotational speed of the blades 112 increases, the reaction torque and the dynamic locking of the foldable arm assembly 200 shall also increase to increase the force with which the rotor arm assembly 200 is locked in the deployed position.

In an embodiment, when the proposed device 100 is used for a foldable rotor arm assembly 200, power and data cables can be routed through the hinge/pivot point with minimal slack and without interfering with the plate spring 106.

In another embodiment, the movement of the foldable rotor arm assembly 200 from the folded position to the unfolded position and back can be motorized, with power for the motorized movement being drawn from the power cable routed through the hinge/pivot point.

Figures 3A, 3B, 3C:
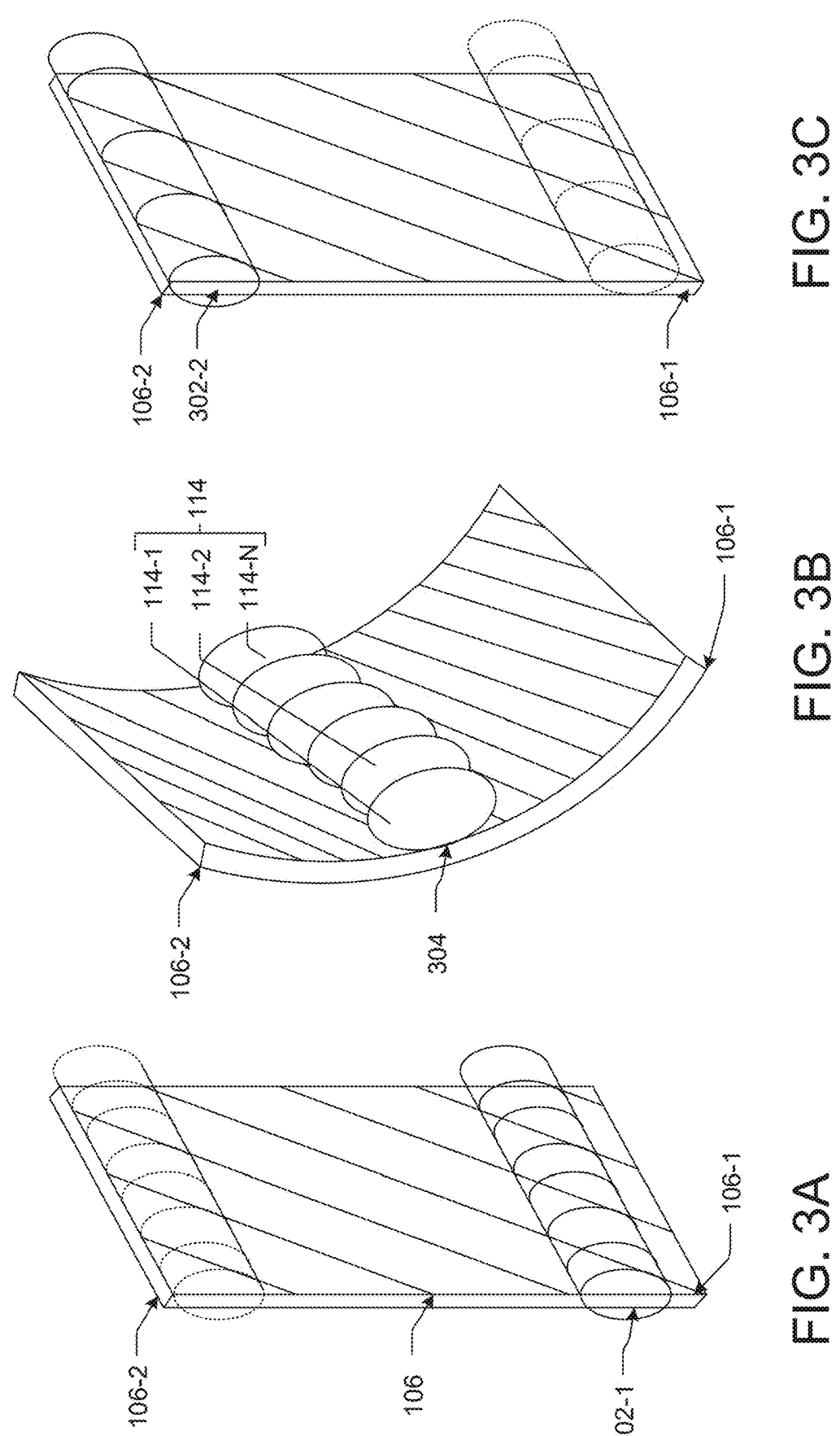
FIG. 3A illustrates an exemplary perspective view of a plurality of bearings at a first contact located towards a first end of a plate spring, when the rotor arm is in the folded position, in accordance with embodiments of the present disclosure.
FIG. 3B illustrates an exemplary perspective view of the plate spring forming a hump profile when the plurality of bearings moved from the first end to the second end of the plate spring and when the rotor arm moves from the folded position to the deployed position, in accordance with embodiments of the present disclosure.
FIG. 3C illustrates an exemplary perspective view of the plurality of bearings at a second contact point of the second

FIGS. 3A to 3C showing exemplary views of the plate spring 106 and plurality of bearings 114-1, 114-2, . . . , 114-N (collectively refer to as bearings 114, herein).

In an embodiment, the cam structure 104 can be configured to move over the plate spring 106 between the first end 106-1 and the second end 106-2 of the plate spring 106 during the movement of the arm assembly 200 from any of the deployed position, and the folded position towards other of the deployed position and the folded position.

In an embodiment, in folded position, the plurality of bearings 114 moves at a first contact point 302-1 located towards a first end 106-1 of the plate spring 106 (refer FIG. 3A); when the rotor arm 110 is in the folded position, the plate spring 106 and move for deployed position, the plurality of bearings 114 moved from the first end 106-1 to the second end 106-2 of the plate spring 106 forming a hump profile or arch profile at point 304 during the movement as shown in FIG. 3B, resulting in the toggling of the rotor arm 110 between the deployed position and the folded position. (refer FIG. 3B). When the rotor arm 110 moves from the folded position to the deployed position, and plurality of bearings 114 reaches at a second end 106-2 of the plate spring 106 at a second contact point 302-2 (refer FIG. 3C).

In an embodiment, there may be no deflection in the plate spring 106 when the foldable arm assembly 200 is in the folded position, in change over, and in deployed position.

FIGS. 4A and 4B illustrate exemplary perspective views 400 showing unfolded and folded position of the landing gear 108.

In an embodiment, the implementation of the proposed device 100 of the present disclosure for landing gear of the AV, the coupling of the landing gear 108 to the device 100 will be connected to the frame 502 (refer frame 502 of FIG. 5) of AV. This enables ease of moving the landing gear 108 between unfolded (FIG. 4A) and folded or deployed position (FIG. 4B), and the device 100 also enables automatic locking of the landing gear 108 in the position to which they are moved, without any additional effort.

FIG. 5 illustrates an exemplary perspective view 500 showing a pair of landing gear coupled to the AV through a pair of the landing gears 108-1 and 108-2 embodied as the proposed devices 100

In an embodiment, the one or more devices 100-1, 100-2 can be connected to the body 502 of the AV. This facilitates multiple coupling of similar or dissimilar aggregates to have added advantage for the AV. The one or more aggregates may include the foldable rotor arm assembly 200, landing gears 108 as shown in FIG. 5, and sensors (not shown here).

Thus, the present disclosure overcomes the abovementioned drawbacks, shortcomings, and limitations associated with existing unmanned aerial vehicles by providing the device 100 including foldable rotor arm assembly 200, which can easily and efficiently transition from an unfolded configuration to a folded configuration while keeping the AV structure compact, lightweight, and convenient for transportation and packaging. In addition, the minimal involvement of components for enabling folding and deploying the rotor arm 110 minimizes the wear and tear, thereby making the overall foldable rotor arm assembly 200 compact, lightweight, and less prone to failure, while reducing maintenance and maintenance costs.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present invention overcomes the above drawbacks, shortcomings, and limitations associated with existing aerial vehicles (AVs).

The present invention provides a simple, improved, and efficient foldable rotor arm assembly for AVs.

The present invention minimizes wear and tear in foldable rotor arm assemblies associated with AVs, reducing maintenance and replacement costs.

The present invention reduces friction and stress during the folding and unfolding of foldable rotor arm assembly associated with AVs.

The present invention provides a device for AVs, which can easily and efficiently transition from an unfolded configuration to a folded configuration while keeping the AV structure compact, lightweight, and convenient for transportation and packaging.

We claim:

1. A device (100) for pivotally holding an aggregate of an aerial vehicle, the device (100) comprising:

a housing (102) fixed to a body (502) of the aerial vehicle;

a cam structure (104) pivotally coupled to the housing (102) for pivotal movement about a pivot axis between a deployed position, in which the aggregate fixed to the cam structure (104) is operational, and a folded position, in which the aggregate is not operational; and a plate spring (106) configured in the housing (102) such that the cam structure (104) is in contact with the plate spring (106); and wherein the cam structure (104) is configured relative to the plate spring (106) such that, when the cam structure (104) is moved between the deployed position and the folded position, the cam structure (104) deflects the plate spring (106) to cause toggling of the aggregate between the deployed position and the folded position;

wherein the housing (102) comprises an inner hollow region therein, and wherein the plate spring (106) is fixed within the inner hollow region.

2. The device as claimed in claim 1, wherein the aggregate is at least one of a rotor arm assembly (200) and a landing gear (108).

3. The device as claimed in claim 1, wherein, when the aggregate is moved about the pivot axis between the deployed position and the folded position, the cam structure (104) moves over the plate spring (106) between a first contact point (302-1) located towards a first end (106-1) of the plate spring (106) and second contact point (302-2) located towards a second end (106-2) of the plate spring (106), the first end (106-1) and the second end (106-2) of the plate spring (106) being two ends of the plate spring (106) along a length of the plate spring (106).

4. The device as claimed in claim 3, wherein the cam structure (104) comprises one or more bearings (114) fixed for free rotation at a predefined distance from the pivot axis, such that when the aggregate undergoes pivotal movement about the pivot axis between the deployed position and the folded position, an outer surface of the one or more bearings (114) moves over the plate spring (106) between the first contact point (302-1) located towards the first end (106-1) of the plate spring (106) and the second contact point (302-2) located towards the second end (106-2) of the plate spring (106).

5. The device as claimed in claim 4, wherein the cam structure (104) comprises a shaft (116) and wherein the one or more bearings (114) are fixed for free rotation on the shaft (116).

6. The device as claimed in claim 4, wherein the bearings (114) are configured over the shaft (116) such that respective outer surfaces of the bearings (114) are in contact with the plate spring (106) along a width of the plate spring (106).

7. The device as claimed in claim 4, wherein, when the aggregate is at the deployed position and the folded position, there is no deflection of the plate spring (106).

8. The device as claimed in claim 1, wherein the housing (102) comprises at least one stop (202) to retain the aggregate in the deployed position and the folded position.

9. The device as claimed in claim 8, wherein, when the aggregate is at the deployed position and the folded position, the plate spring (106) is in a deflected position to provide a biasing force to force the cam structure (104) against the respective stop (202).

10. The device as claimed in claim 1, wherein the plate spring (106) is made of a material that includes carbon fiber.

11. A foldable rotor arm assembly (200) for an aerial vehicle, the rotor arm assembly (200) comprising:

an rotor arm (110) comprising an outer end (110-1) holding at least one rotor (204), and an inner end (110-2) pivotally coupled to a housing (102) for pivotal movement about a pivot axis between a deployed position, in which the at least one rotor (204) fixed to the outer end (110-1) is operational, and a folded position, in which the at least one rotor (204) is not operational; wherein the rotor arm assembly (200) is configured to pivotally move in a horizontal plane, and wherein direction of movement of the rotor arm (110) from the folded position to the deployed position is such that a reaction torque of the at least one rotor (204) is in a direction that retains the rotor arm (110) in the deployed position;

wherein the inner end (110-2) of the arm assembly (200) comprises a cam structure (104), such that when the arm assembly (200) undergoes pivotal movement about the pivot axis between the deployed position and the folded position, the cam structure (104) moves over a plate spring (106) configured within the housing (102) to toggle the rotor arm assembly (200) between the deployed position and the folded position.

12. A device (100) for pivotally holding an aggregate, the device (100) comprising:

a housing (102);

a cam structure (104) pivotally coupled to the housing (102) for pivotal movement about a pivot axis between a deployed position, in which the aggregate fixed to the cam structure (104) is operational, and a folded position, in which the aggregate is not operational; and a plate spring (106) configured in the housing (102) such that the cam structure (104) is in contact with the plate spring (106); and wherein the cam structure (104) is configured relative to the plate spring (106) such that, when the cam structure (104) is moved between the deployed position and the folded position, the cam structure (104) deflects the plate spring (106) to cause toggling of the aggregate between the deployed position and the folded position wherein, when the aggregate is moved about the pivot axis between the deployed position and the folded position, the cam structure (104) moves over the plate spring (106) between a first contact point (302-1) located towards a first end (106-1) of the plate spring (106) and second contact point (302-2) located towards a second end (106-2) of the plate spring (106), the first end (106-1) and the second end (106-2) of the plate spring (106) being two ends of the plate spring (106) along a length of the plate spring (106).

* * * * *